US008503310B2

(12) United States Patent
Blair et al.

(10) Patent No.: US 8,503,310 B2
(45) Date of Patent: Aug. 6, 2013

(54) TECHNIQUE FOR POLICY CONFLICT RESOLUTION USING PRIORITY WITH VARIANCE

(75) Inventors: Dana Blair, Alpharetta, GA (US); Kerry Lynn, Sudbury, MA (US)

(73) Assignee: Cisco Technology, Inc., San Jose, CA (US)

( * ) Notice: Subject to any disclaimer, the term of this patent is extended or adjusted under 35 U.S.C. 154(b) by 177 days.

(21) Appl. No.: 12/825,013

(22) Filed: Jun. 28, 2010

(65) Prior Publication Data

US 2010/0265825 A1 Oct. 21, 2010

Related U.S. Application Data

(63) Continuation of application No. 11/239,573, filed on Sep. 29, 2005, now Pat. No. 7,751,331.

(60) Provisional application No. 60/679,184, filed on May 9, 2005.

(51) Int. Cl.

*G08C 15/00* (2006.01)
*G06F 15/173* (2006.01)
*H04L 12/00* (2006.01)
*H04L 12/56* (2006.01)

(52) U.S. Cl.

CPC ................ *H04L 45/00* (2013.01); *H04L 45/02* (2013.01); *H04L 45/12* (2013.01)
USPC ............ 370/238; 370/255; 709/240; 709/241

(58) Field of Classification Search

USPC ................. 370/238, 254, 255; 709/239, 240, 709/241
See application file for complete search history.

(56) References Cited

U.S. PATENT DOCUMENTS

| | | | |
|---|---|---|---|
| 6,286,052 | B1 | 9/2001 | McCloghrie et al. |
| 6,301,613 | B1 | 10/2001 | Ahlstrom et al. |
| 6,327,618 | B1 | 12/2001 | Ahlstrom et al. |
| 6,393,473 | B1 | 5/2002 | Chu |
| 6,418,468 | B1 | 7/2002 | Ahlstrom et al. |
| 6,463,470 | B1 | 10/2002 | Mohaban et al. |
| 6,466,984 | B1 | 10/2002 | Naveh et al. |
| 6,505,244 | B1 | 1/2003 | Natarajan et al. |

(Continued)

OTHER PUBLICATIONS

Perlman, Radia, "Interconnections Second Edition: Bridges, Routers, Switches, and Internetworking Protocols," Sections 12.1-12.3 pp. 299-324, Addison Wesley Longman, Inc. 2000.

(Continued)

*Primary Examiner* — Paul H Masur
(74) *Attorney, Agent, or Firm* — Cesari and McKenna, LLP

(57) ABSTRACT

In one embodiment, a value for a option for a particular policy of a plurality of policies that are ranked in a priority order is ascertained. A variance to the value associated with the option for the particular policy is applied to define a range of acceptable values for the particular policy. A determination is made whether one or more other options exist that have values within the range of acceptable values for the particular policy. If no other options exist that have values within the range of acceptable values for the particular policy, the option is selected If other options exist that have values within the range of acceptable values for the particular policy, the ascertaining, applying and determining is repeated for a next lower priority policy of the plurality of policies to consider the other options, the repeating to occur successively until an option is selected.

20 Claims, 5 Drawing Sheets

(56) References Cited

U.S. PATENT DOCUMENTS

| | | | | |
|---|---|---|---|---|
| 6,584,502 | B1 | 6/2003 | Natarajan et al. | |
| 6,650,731 | B1 | 11/2003 | Steltner et al. | |
| 6,718,380 | B1 | 4/2004 | Mohaban et al. | |
| 6,760,777 | B1 * | 7/2004 | Agarwal et al. | 709/238 |
| 6,775,280 | B1 | 8/2004 | Ma et al. | |
| 6,795,860 | B1 | 9/2004 | Shah | |
| 6,798,743 | B1 | 9/2004 | Ma et al. | |
| 6,798,746 | B1 | 9/2004 | Kloth et al. | |
| 6,804,199 | B1 * | 10/2004 | Kelly et al. | 370/238 |
| 6,822,940 | B1 | 11/2004 | Zavalkovsky et al. | |
| 6,836,462 | B1 | 12/2004 | Albert et al. | |
| 6,868,065 | B1 | 3/2005 | Kloth et al. | |
| 6,870,812 | B1 | 3/2005 | Kloth et al. | |
| 6,934,853 | B2 | 8/2005 | Christopherson et al. | |
| 2003/0204619 | A1 | 10/2003 | Bays | |
| 2004/0138858 | A1 | 7/2004 | Carley | |
| 2006/0168322 | A1 | 7/2006 | Gray et al. | |
| 2008/0260123 | A1 | 10/2008 | Pack | |

OTHER PUBLICATIONS

Rekhter, Y. et al., RFC 1771, "A Border Gateway Protocol 4 (BGP-4)," Network Working Group, Mar. 1995, pp. 1-54.

"NetFlow Services Solutions Guide," Oct. 2004, pp. 1-71, Cisco Systems, Inc.

"NetFlow v9 Export Format," Cisco IOS Release, 2003, pp. 1-22, Cisco Systems, Inc.

U.S. Appl. No. 10/980,550, filed Nov. 3, 2004, entitled Method ans Apparatus for Automatically Optimizing Routing Operations at the Edge of a Network, by Shah et al.

U.S. Appl. No. 11/113,629, filed Apr. 25, 2005, entitled Active Probe Path Management, by Blair et al.

U.S. Appl. No. 11/113,582, filed Apr. 25, 2005, entitled Active Probe Target Management, by Metzger et al.

* cited by examiner

PRIORITY-BASED POLICY WITH VARIANCE TABLE
300

| PRIORITY VALUE 305 | POLICY DEFINITION 310 | VARIANCE 315 |
|---|---|---|
| 0 | REACHABILITY | 0 |
| 1 | LOWEST DELAY | 10% |
| 2 | LOWEST PACKET LOSS | 5 PACKETS/min |
| 3 | LOWEST COST | 20% |
| 4 | LOWEST UTILIZATION | 25% |
| ⋮ | ⋮ | ⋮ |

(PRIORITY POLICY) AND VARIANCE

| PATHS | (1) 10% | | (2) 5 PACKETS/min | | (3) 20% | | (4) 25% | | |
|---|---|---|---|---|---|---|---|---|---|
| A | 100 ms | ⇒ | 15 PACKETS/min | | X | | X | | |
| B | 108 ms | ⇒ | 3 PACKETS/min | ⇒ | 10 | ⇒ | 40% | ⇒ | ✓ |
| C | 102 ms | ⇒ | 0 PACKETS/min | ⇒ | 10 | ⇒ | 90% | | |
| D | 130 ms | | X | | X | | X | | |

FIG. 4

TECHNIQUE FOR POLICY CONFLICT RESOLUTION USING PRIORITY WITH VARIANCE

RELATED APPLICATIONS

This application is a continuation of U.S. patent application Ser. No. 11/239,573, entitled TECHNIQUE FOR POLICY CONFLICT RESOLUTION USING PRIORITY WITH VARIANCE, filed by Blair et al. on Sep. 29, 2005, the contents of which are hereby incorporated by reference in their entirety. Such application claims the benefit of U.S. Provisional Application Ser. No. 60/679,184, entitled SYSTEMS AND METHODS FOR USE WITH OPTIMIZED EDGE ROUTING, filed by Blair et al. on May 9, 2005, the contents of which are also hereby incorporated in their entirety.

BACKGROUND OF THE INVENTION

1. Field of the Invention

The present invention relates to computer networks and more particularly to making policy-based decisions in a computer network.

2. Background Information

A computer network is a geographically distributed collection of nodes interconnected by communication links and segments for transporting data between end nodes, such as personal computers and workstations ("hosts"). Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas." It may be desirable, however, to increase the number of nodes capable of exchanging data; in this case, interdomain routers executing interdomain routing protocols are used to interconnect nodes of the various ASes. Moreover, it may be desirable to interconnect various ASes that operate under different administrative domains. As used herein, an AS or an area is generally referred to as a "domain," and a node that interconnects different domains together is generally referred to as a "border node or border router." In general, the autonomous system may be an enterprise network, a service provider or any other network or subnetwork. Furthermore, the autonomous system may be multi-homed, i.e., comprising a plurality of different peer (neighboring) connections to one or more other routing domains or autonomous systems.

The administrative entity of an AS typically configures network nodes within the AS to route packets using predetermined intradomain routing protocols, or interior gateway protocols (IGPs), such as conventional link-state protocols and distance-vector protocols. These IGPs define the manner with which routing information and network-topology information is exchanged and processed in the AS. Examples of link-state and distance-vectors protocols known in the art are described in Sections 12.1-12.3 of the reference book entitled *Interconnections, Second Edition*, by Radia Perlman, published January 2000, which is hereby incorporated by reference as though fully set forth herein.

Link-state protocols, such as the Open Shortest Path First (OSPF) protocol, use cost-based routing metrics to determine how data packets are routed in an AS. As understood in the art, a relative cost value may be associated with a network node to determine the relative ease/burden of communicating with that node. For instance, the cost value may be measured in terms of the average time for a data packet to reach the node, the amount of available bandwidth over a communication link coupled to the node, the monetary cost per amount of bandwidth, etc. Network nodes in the AS generate a set of cost values associated with their neighboring nodes. Each set of cost values is then "advertised" (flooded) to the other interconnected nodes. Using the advertised cost values, each node can generate a consistent "view" of the network topology, thereby enabling the nodes to determine lowest-cost routes within the AS.

Distance-vector protocols, such as the Interior Gateway Routing Protocol (IGRP) or Routing Information Protocol (RIP), use distance-based routing metrics to determine how data packets are routed in an AS. A network node may associate a distance metric with each of its interconnected nodes in the AS. For example, the distance metric may be based on, e.g., a number of hops between a pair of nodes or an actual distance separating the nodes. Operationally, the network nodes determine distances to reachable nodes in the AS and communicate these distance metrics to their neighboring nodes. Each neighboring node augments the received set of distance metrics with its own distance measurements and forwards the augmented set of metrics to its neighbors. This process is continued until each node receives a consistent view of the network topology.

An intermediate network node often stores its routing information in a routing table maintained and managed by a routing information base (RIB). The routing table is a searchable data structure in which network addresses are mapped to their associated routing information. However, those skilled in the art will understand that the routing table need not be organized as a table, and alternatively may be another type of searchable data structure. Although the intermediate network node's routing table may be configured with a predetermined set of routing information, the node also may dynamically acquire ("learn") network routing information as it sends and receives data packets. When a packet is received at the intermediate network node, the packet's destination address may be used to identify a routing table entry containing routing information associated with the received packet. Among other things, the packet's routing information indicates the packet's next-hop address.

A plurality of interconnected ASes may be configured to exchange routing and reachability information among neighboring interdomain routers of the systems in accordance with a predetermined external gateway protocol, such as the Border Gateway Protocol (BGP). The BGP protocol is well known and generally described in Request for Comments (RFC) 1771, entitled *A Border Gateway Protocol* 4 (BGP-4), published March 1995, which is hereby incorporated by reference in its entirety. An adjacency is a relationship formed between selected neighboring (peer) routers for the purpose of exchanging routing information messages and abstracting the network topology. The routing information exchanged by BGP peer routers typically includes destination address prefixes, i.e., the portions of destination addresses used by the routing protocol to render routing ("next hop") decisions. Examples of such destination addresses include IP version 4 (IPv4) and version 6 (IPv6) addresses. BGP generally operates over a reliable transport protocol, such as TCP, to establish a TCP connection/session. To implement the BGP protocol, each AS includes at least one border node through which it communicates with other, interconnected ASes. Because data packets enter and exit the AS through the border node, the border node is said to be located at the "edge" of the AS.

The BGP protocol generally facilitates policy-based routing in which an administrative entity places restrictions on inter-AS routing operations. For example, the administrator of a company's AS may employ a BGP routing policy where network traffic leaving the AS is not permitted to enter a competitor's network, even if the competitor provides an otherwise acceptable routing path. BGP policies typically do not depend on the cost-based or distance-based routing metrics used with interior gateway protocols. Instead, the BGP policies rely on AS path-vector information. More specifically, the BGP protocol enables a plurality of interconnected ASes to exchange network topology information. Using this topology information, each AS can derive "paths" to the other reachable ASes, each path defining a logical sequence of ASes. For example, a path between an AS1 and an AS3 may be represented by the sequence {AS1, AS2, AS3} when only AS2 intervenes. Based on the content of these AS sequences, the BGP protocol may filter those paths that do not coincide with the administrator's policies. As such, inter-AS routing operations are performed using only the "best paths" that satisfy the BGP policies.

Because BGP policies are applied to sequences of ASes, the policies are not able to optimize inter-AS routing in other respects, such as optimizing bandwidth utilization or minimizing cost or distance metrics. Furthermore, interior gateway protocols cannot remedy these deficiencies in the BGP protocol because they do not scale well when applied to a large number of network nodes spanning multiple ASes. For instance, the process of exchanging cost-based or distance-based routing metrics among a large number of network nodes would not only consume an unreasonable amount of network bandwidth, but also would consume an unacceptable amount of processing resources for processing those metrics to generate a convergent view of the network topology.

To address the limitations of conventional routing protocols, network administrators sometimes implement additional optimizations to improve network performance. For example, a load-balancing or cost-minimizing procedure may be used in conjunction with traditional routing protocols to redistribute data flows entering or exiting a multi-homed routing domain or AS. In some networks, border nodes located at edges of ASes, e.g., between an enterprise network and one or more Internet Service Providers (ISPs), may be configured as Optimized Edge Routers (OERs). Here each OER may be configured to periodically select an Optimal Exit Link (OEL) to each ISP for a given destination prefix (a monitored prefix) based on performance, load, cost, and service level agreements (SLAs) associated with connections to the ISP. Ultimately, the end result for the enterprise network is improved Internet performance, better load distribution, and/or lower costs for Internet connections. These additional procedures may require the border nodes (OERs) to collect various network statistics associated with the data flows. An exemplary software application that may be used to collect the network statistics at the border nodes is NetFlow™ by Cisco Systems, Incorporated, which is described in more detail in the technical paper entitled *Netflow Services Solutions Guide*, published September 2002, and is hereby incorporated by reference as though fully set forth herein.

Techniques that may be used to select the OEL for the monitored prefix include passive monitoring and/or active probing. Passive monitoring relies on gathering information from OERs learned from monitoring conventional user traffic, such as throughput, timing, latency, packet loss, reachability, etc. For example, selected interfaces at one or more network nodes monitor incoming and outgoing data flows and collect various statistics for the monitored flows. Notably, interfaces may include physical interfaces, such as a port on a network interface card, and/or logical interfaces, such as virtual private networks (VPN) implemented over multiple physical interfaces. Each node stores address prefixes and statistics for the monitored data flows, which may be periodically exported to a central management node (e.g., a "collector" or "Master"). The central management node is configured to receive prefixes and statistics from a plurality of different network nodes. A record format that may be used to export the raw prefixes and statistics is described in the technical paper entitled *Netflow v9 Export Format*, which is hereby incorporated by reference in its entirety. Further, a more sophisticated interaction (e.g., a filtered and/or preprocessed information exchange) between border nodes and a Master node is described in commonly owned copending U.S. patent application Ser. No. 10/980,550, entitled METHOD AND APPARATUS FOR AUTOMATICALLY OPTIMIZING ROUTING OPERATIONS AT THE EDGE OF A NETWORK, filed by Shah et al. on Nov. 3, 2004, the contents of which are hereby incorporated in its entirety.

Active probing, on the other hand, relies on probe packets to measure various parameters associated with accessing the monitored prefix from an originating node (source). Here, the originating node may generate multiple probe packets that are then forwarded via different exit interfaces (e.g., data links) on different paths to target nodes (targets) in the monitored (destination) prefix. Upon receiving the probe packets, the targets respond to the originating node, e.g., with return packets or other known probe responses. The originating node may eventually acquire the responses and use them to measure various parameters, such as delay, loss, jitter, and reachability, etc., associated with accessing the destination prefix via the different links.

Once the relevant statistics are obtained (e.g., at the central management node), the collected parametric (performance) information (i.e., learned from passive monitoring or active probing) is analyzed, such as either manually by a network administrator or dynamically by a software script. The analyzed information may then be used to select an OEL from among the different exits that may be used to reach the destination prefix, and/or to determine whether the data flows may be more optimally distributed. For instance, suppose an administrator desires to make more efficient use of available network bandwidth and determines that a first network interface is under-utilized and a second interface is oversubscribed. In this case, at least some data flows at the second interface may be redirected to the first interface. To effectuate such a routing change, the administrator may, for example, make static changes to the routing tables at the first and second interfaces or may re-assign local-preference values (or other priority values) associated with the data flows.

The selection of an OEL or best path (e.g., for a particular prefix) is generally based on one or more policies. As defined herein, a policy is any defined rule that determines the use of resources within the network. A policy may be based on a user, a device, a subnetwork, a network, or an application. For example, a router may be configured with a policy defined to route traffic destined for a particular prefix over a best path having the shortest hop count to the prefix. Alternatively, the policy may be defined to route traffic from a type of application over a best path based on the shortest delay or round trip time (RTT). Those skilled in the art will understand that other policies may be defined, such as, e.g., reachability, lowest packet loss, best mean opinion score (MOS), which provides a numerical measure of the quality of human speech at the destination end of the circuit (e.g., for Voice over IP, or VoIP), bandwidth, utilization, etc.

In isolation, each policy may be simply analyzed and enforced for a set of options, e.g., paths. For instance, selecting a best path to a destination prefix based on the shortest physical distance will generally result in a single path selection. In the event, however, that a plurality of policies is applied to a particular prefix, the decision to apply which policy is conventionally based on either a weighted method or on a strict priority basis. In the weighted method, a weight scheme (function) is defined (e.g., by an Enhanced Interior Gateway Routing Protocol, EIGRP) where each policy is assigned a particular weight according to a configured significance/importance. The function applies the weights to the measurements for each policy (e.g., multiplies them), and combines the values for each policy to produce a single result for a particular option (path). The highest (or lowest) total result is selected as the best option. A problem with the weighted method, however, is that the weights are generally arbitrary values configured by a system administrator, and the result may not necessarily coincide with the best option according to policy importance. For instance, if the options are a plurality of paths for a VoIP call, the MOS may be the most important policy upon which to base the decision, and as such may be assigned a higher weight. Assume, though, that a first path has superior values in all policies (e.g., hop count, bandwidth, etc.), except the MOS, to a second path. In this case, depending upon the arbitrarily configured weight values, the first path may be selected over the second path, despite not having a superior value for the most important policy basis, i.e., the MOS.

In the strict priority method, on the other hand, each of the plurality of policies is assigned an exclusive priority, such that the policies are analyzed and enforced in order of importance. In this instance, the highest priority policy is analyzed, and a best option is selected according to the policy. In the event the policy metrics are equal for two or more options at the highest priority, the next lower policy is analyzed for those two or more equal options, and so on, until a single best option exists to select and enforce. In this manner, the policies are examined in their order of importance, resulting in selecting the best option based on the most important policy. A problem with the strict priority method, however, is that the lesser priority policies are only considered, (e.g., analyzed and compared) when the analysis of higher priority policies result in two or more equal options. For instance, as mentioned above, if the options are a plurality of paths for a VoIP call, the MOS may be the most important policy upon which to base the decision, and as such may be assigned the highest priority. Assume, though, that a first path has a MOS value that is just slightly better than that of a second path, but that the second path has an RTT value (e.g., the second highest priority) that is substantially better than that of the first path. In this case, the first path would be selected based on the MOS for its slightly better value, even though the second path has a much better RTT value. Here, the selected path may not, in fact, be the "best" option since the strict priority method fails to consider the lesser priority values (notably, that is, with less importance, not no importance), except in the case of equal value options at higher priorities. There remains a need, therefore, for a more efficient technique to make policy-based decisions according to policy priority (importance).

SUMMARY OF THE INVENTION

The present invention is directed to a technique for efficiently rendering a policy-based decision from a plurality of options based on policy priority in a computer network.

According to the novel technique, each of a plurality of policies is assigned an exclusive priority value, as well as a "variance" specifying an acceptable value range (e.g., a percentage). Beginning at the highest priority policy, values corresponding to the plurality of options are analyzed based upon the current priority policy, and a "best" option is determined according to the current policy. Thereafter, the variance for the current policy is applied to the value of the best option, defining a range of acceptable values for the current policy, and remaining options having an acceptable value for the current policy are established. If only one remaining option exists, that option is selected as the best option. Otherwise, the remaining options are analyzed based upon the next priority policy, a best option is determined, the variance is applied, and remaining options are established in the same manner, until a single best option exists. Notably, in the event the lowest priority policy is analyzed and more than one option still remains in the subset, the best option may be selected from the subset based upon a known weighted policy or strict policy (i.e., based upon the highest priority policy) technique.

Advantageously, the novel technique efficiently renders a policy-based decision from a plurality of options based on policy priority in a computer network. By applying a variance to each prioritized policy, thereby creating a range of acceptable values for the policy based on the best option for that policy, the novel technique allows other options having an acceptable value to be considered again at the next priority policy. In this way, the ultimate best option selection is not limited to the best option of the highest priority value, but rather the best option of a plurality of options with acceptable values at the different priority policies. Also, reducing the variance of each prioritized policy allows for the novel technique to closely reflect a strict priority technique with minimal reconfiguration.

BRIEF DESCRIPTION OF THE DRAWINGS

The above and further advantages of the invention may be better understood by referring to the following description in conjunction with the accompanying drawings in which like reference numerals indicate identically or functionally similar elements, of which:

FIG. 3 is an exemplary priority-based policy with variance table that may be used in accordance with the present invention;

FIG. 4 is an exemplary chart illustrating an efficient policy-based decision making process in accordance with the present invention.

DETAILED DESCRIPTION OF AN ILLUSTRATIVE EMBODIMENT

Figure 1:
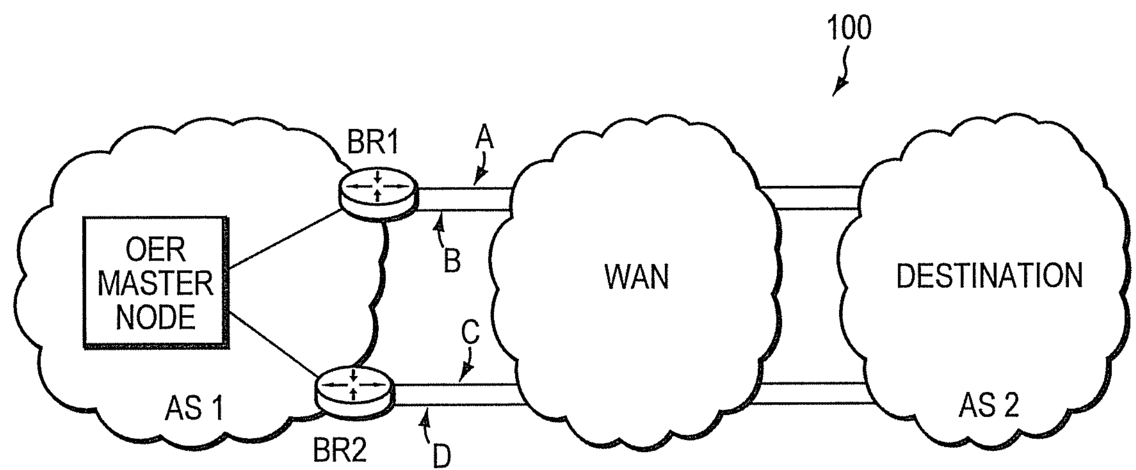
FIG. 1 is a schematic block diagram of an exemplary computer network that may be advantageously used with the present invention.

FIG. 1 is a schematic block diagram of an exemplary computer network 100 comprising a multi-homed autonomous system (AS) AS1 (e.g., an enterprise or content provider network) interconnected to AS2 (e.g., a content consumer network) via a wide area network (WAN), e.g., one or more ISPs. Although each of AS1 and AS2 is illustratively an autonomous system, those skilled in the art will appreciate that the ASes may be configured as routing domains or other networks or subnetworks. AS1 comprises one or more network nodes, including a set of communicating border nodes (illustratively, edge or border routers, BRs) BR1 and BR2, through which client communications, such as data packet traffic, can pass into and out of the AS. For example, BR1 and BR2 permit communication from AS1 to AS2 (via the WAN). Routing operations at the border nodes BR1-2 may be managed by an optimized edge routing (OER) "Master" node, which may be connected to the border nodes by, e.g., point-to-point links or a local area network. These examples are merely representative. Those skilled in the art will understand that any number of routers and nodes may be used in the computer network and connected in a variety of ways, and that the view shown herein is for simplicity.

Data packets may be communicated by the ASes (AS1 and AS2) and WAN using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, etc. Routing decisions within an AS may rely on predetermined "interior" gateway protocols (IGPs), such as conventional link-state or distance-vector protocols. In addition, data packets containing network topology information may be exchanged among the ASes using "external" gateway protocols, such as the Border Gateway Protocol (BGP).

Figure 2:
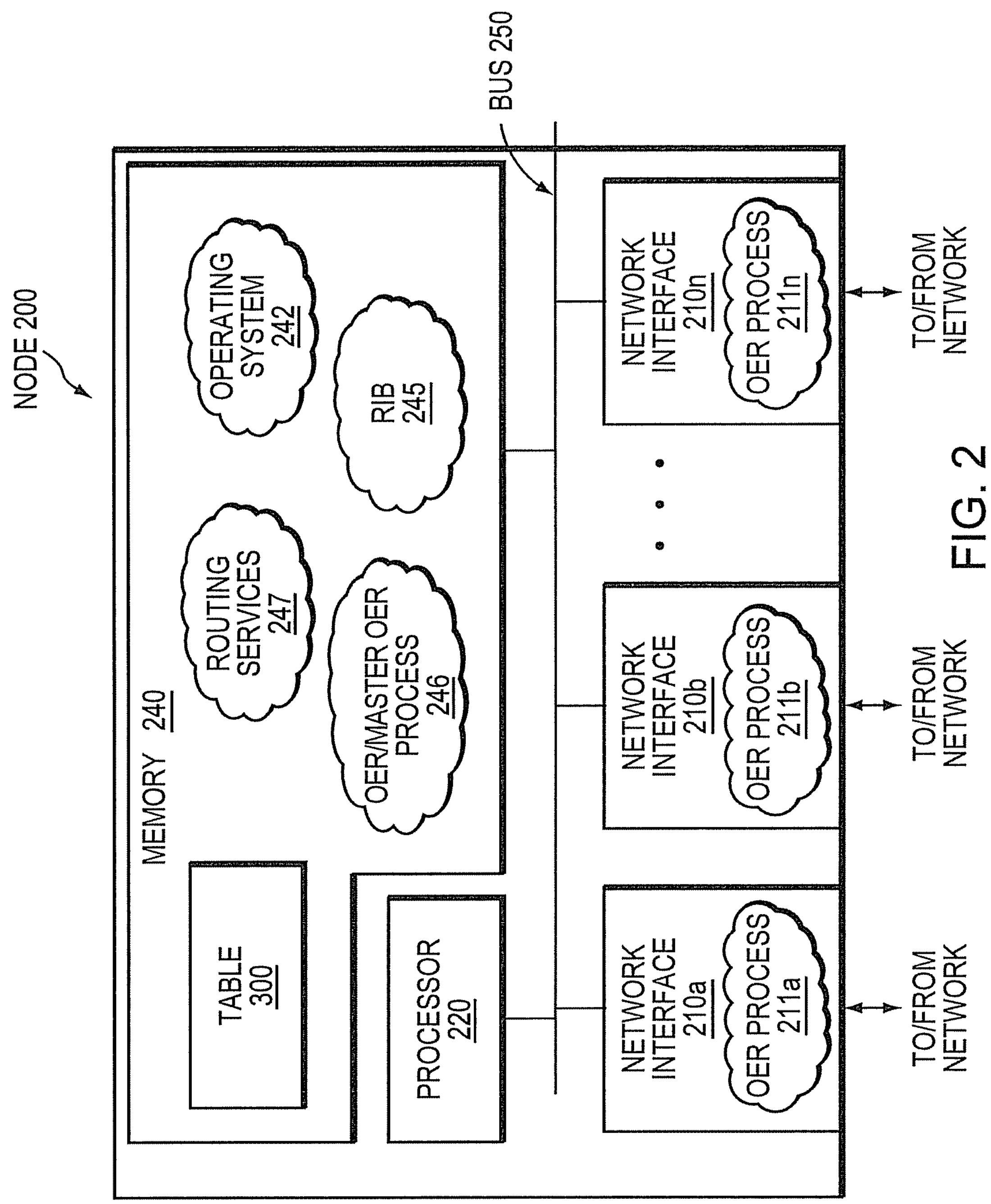
FIG. 2 is a schematic block diagram of an exemplary node that may be advantageously used with the present invention.

FIG. 2 is a schematic block diagram of an exemplary node 200 that may be advantageously used with the present invention, such as, e.g., a border node (e.g., an edge router) or a master node. The node comprises a plurality of network interfaces 210*a-n* (e.g., line cards), a processor 220, and a memory 240 interconnected by a system bus 250. The network interfaces 210 contain the mechanical, electrical and signaling circuitry for communicating data over physical links coupled to the network 100, and also may be adapted to process the incoming and outgoing data, such as managing active probe packets in accordance with the present invention. The network interfaces may be further configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc. Notably, a physical network interface 210 may also be used to implement one or more virtual network interfaces, such as for virtual private network (VPN) access, known to those skilled in the art. Both physical network interfaces and virtual network interfaces (e.g., routes out of an edge router) are referred to generally herein as "exits."

The memory 240 comprises a plurality of storage locations that are addressable by the processor 220 and the network interfaces 210 for storing software programs and data structures associated with the present invention. The processor 220 may comprise necessary elements or logic adapted to execute the software programs and manipulate the data structures, such as table 300. An operating system 242 (e.g., the Internetworking Operating System, or IOS™, of Cisco Systems, Inc.), portions of which are typically resident in memory 240 and executed by the processor, functionally organizes the router by, inter alia, invoking network operations in support of software processes and/or services executing on the router. These software processes and/or services may include Routing Information Base (RIB) 245, OER/Master OER Process 246, and routing services 247. It will be apparent to those skilled in the art that other processor and memory means, including various computer-readable media, may be used to store and execute program instructions pertaining to the inventive technique described herein.

Routing services 247 contain computer executable instructions executed by processor 220 to perform functions provided by one or more routing protocols, such as OSPF, IS-IS, IP, BGP, etc. These functions may be configured to manage a forwarding information database (not shown) containing, e.g., data used to make forwarding decisions. The RIB 245 maintains copies of routes (paths) provided by the routing protocols, such as IGP or BGP, in order to compute best paths/routes for installation into the routing table (not shown).

According to the illustrative embodiment of the present invention, the OER/Master OER Process 246 is employed by an OER node (e.g., border routers BR1-2) and an OER Master node (e.g., an OER Master router), respectively. The Master OER process 246 executing on the OER Master node communicates with border routers BR1-2 to request, among other things, the monitoring of a set of address prefixes. The OER processes 246 executing on the border routers monitor traffic at the edge of the AS1 and respond with, inter alia, network statistics corresponding to the monitored prefixes. Illustratively, instances of the OER process 246 execute on the network interfaces 210 as OER processes 211*a-n* configured to measure various types of network statistics acquired from monitored traffic. These statistics are then forwarded from the OER processes 211*a-n* to the OER process 246. The statistics may correspond to various traffic measurements, such as round-trip delay times, data throughput (i.e., the amount of data transferred or received), packet loss, reachability, etc. In general, the OER processes (notably, 246 and/or 211*a-n*) may measure any arbitrary traffic metric, including conventional cost-based and distance-based metrics. Further, the OER Process 246 and/or 211*a-n* may calculate statistical averages, variances, medians, etc. of a collection of traffic measurements.

Techniques for learning address prefixes, and collecting traffic statistics (passively monitoring) are described in commonly-owned copending U.S. patent application Ser. No. 10/980,550, entitled METHOD AND APPARATUS FOR AUTOMATICALLY OPTIMIZING ROUTING OPERATIONS AT THE EDGE OF A NETWORK, filed by Shah et al. on Nov. 3, 2004, the contents of which are hereby incorporated in its entirety. Also, techniques for actively probing (managing paths and targets of active probe packets) are described in commonly-owned copending U.S. patent application Ser. No. 11/113,629, now issued as U.S. Pat. No. 7,619,982, entitled ACTIVE PROBE PATH MANAGEMENT, filed by Blair et al. on Apr. 25, 2005, and commonly owned copending U.S. patent application Ser. No. 11/113,582, now issued as U.S. Pat. No. 7,675,861 entitled ACTIVE PROBE TARGET MANAGEMENT, filed by Metzger et al. on Apr. 25, 2005, the contents of both of which are hereby incorporated in their entirety.

The statistics from the OER Process 246 and/or 211*a-n* are then processed at the Master node in accordance with the Master OER process 246. More specifically, the Master OER process 246 analyzes the statistics and determines whether the distribution of traffic entering and/or leaving the AS1 can be optimized, e.g., according to one or more policies. If so, the Master OER process may redistribute traffic routed through the border nodes by, e.g., associating new BGP local-preference values with selected traffic or statically changing the routing table contents of the border nodes. In that sense, the Master OER process selects optimal exit links (OELs) to various destination prefixes. Notably, the Master OER process 246 may be distributed among a plurality of nodes, and thus need not reside in a single OER Master node. Also, it is not necessary for a single OER Master node to contain routing processes or routing tables, other than what is necessary for communication with the border nodes. Those skilled in the art will understand that while the OER Master node and OER node (e.g., a border router) are shown as separate nodes (e.g., in FIG. 1), the Master and OER node may be configured within the same node. For example, a single border router (e.g., a home office router) having multiple exits/paths may both monitor the quality of its exits and select the OEL itself.

The present invention is directed to a technique for efficiently rendering a policy-based decision from a plurality of options based on policy priority in a computer network. According to the novel technique, each of a plurality of policies is assigned an exclusive priority value, as well as a "variance" specifying an acceptable value range (e.g., a percentage). Beginning at the highest priority policy, values corresponding to the plurality of options are analyzed based upon the current priority policy, and a "best" option is determined according to the current policy. Thereafter, the variance for the current policy is applied to the value of the best option, defining a range of acceptable values for the current policy, and remaining options having an acceptable value for the current policy are established. If only one remaining option exists, that option is selected as the best option. Otherwise, the remaining options are analyzed based upon the next priority policy, a best option is determined, the variance is applied, and remaining options are established in the same manner, until a single best option exists. Notably, in the event the lowest priority policy is analyzed and more than one option still remains in the subset, the best option may be selected from the subset based upon a known weighted policy or strict policy (i.e., based upon the highest priority policy) technique.

In accordance with the present invention, one or more prioritized policies may be configured on a node for use when rendering a best option decision from a plurality of options, as will be understood by those skilled in the art. For example, an OER Master node may define a number of policies regarding the selection of a best path from a source (e.g., a border node under the control of the OER Master) to a destination (e.g., a prefix within another AS, AS2). FIG. 3 is an exemplary priority-based policy with variance table 300 that may be used in accordance with the present invention. Table 300 is illustratively stored in memory 240 and includes one or more entries 320, each comprising a plurality of fields for storing a priority value 305 for each policy definition 310, and a variance 315 to be applied to the particular policy. The table 300 is illustratively maintained and managed by OER/Master OER process 246. Those skilled in the art will understand that while a table is shown and described herein, other known data structures may be used in accordance with the present invention. Policy definitions 310 may include such policies as reachability (highest priority "0"), lowest round trip time (RTT) or delay (e.g., priority "1"), lowest packet loss (e.g., priority "2"), lowest cost (e.g., priority "3"), lowest utilization (e.g., priority "4"), etc. Notably, reachability may be configured as the absolute highest priority to consider, because if a path is unable to reach the destination, it should not be considered at any other policy level. Other policies may be defined, as will be understood by those skilled in the art, (e.g., range, MOS, etc.), and the table 300 as shown is merely representative.

To determine which option of a plurality of options is the best, each policy 310 is examined in order of priority 305. At each prioritized policy, a best option (path) is selected, such as by using OER techniques as described above. Once the best option for the policy is selected, the variance value 315 is applied to determine the range of acceptable values. In other words, a variance creates a distinction among options that are "close" in values (metrics) for that particular policy (i.e., acceptable), and those that are not (i.e., unacceptable). The variance value 315 may be configured as any percentage, specific value, etc., that is greater than or equal to zero. Those skilled in the art will understand that while a distinct variance has been configured for each policy, a single variance value (e.g., a percentage) may be defined for all policies. For example, a variance of 10% may be applied to all policies.

Exemplary equations that may be used to compute a maximum acceptable value for a range of acceptable values are as follows. For instance, a first equation that may be used in the event the variance is a percentage (e.g., for delay) is:

maximum acceptable value=lowest (best) value*((variance+100)/100)

On the other hand, a second equation that may be used in the event the variance is a specific value (e.g., for loss) is:

maximum acceptable value=lowest (best) value+variance

Options (paths) that do not fall within the range of acceptable values (defined by the best value and variance) are removed from consideration for the current and future (i.e., lower priority) policies. In the event a single best option exists for the current priority policy, that option is selected. In the event, however, that more than one option remains, the remaining options (i.e., acceptable options) are analyzed under the next (lower) priority policy in the same manner, until a single best option remains. Notably, a variance equal to zero at any policy simplifies the decision at that policy to strict priority, i.e., only equivalent values are considered acceptable. Moreover, a variance that is very large, e.g., such that all available options are acceptable, makes the policy basically ineffective. Thus, configuring a variance between zero and a very large value allows for tuning the range of acceptable values for a particular policy. When the values for the remaining options at the lowest priority policy are within the acceptable range (or equal), the node may select the best option based on other known methods, such as a weighted technique, strict priority, random selection, etc. Those skilled in the art will understand that the other known methods need not be applied only to the remaining subset of options at the lowest priority, but may instead be applied to all available paths.

As a brief example, FIG. 4 is an exemplary chart 400 illustrating an efficient policy-based decision making process in accordance with the present invention. Assume, for example, that the Master OER node of FIG. 1 is configured to use the priority-based policy with variance table 300 to select a best path to a destination AS2 from among a plurality of possible paths, A-D. The rows of the chart 400 indicate the possible paths (options), while the columns indicate each configured policy (e.g., from table 300) in descending priority level (i.e., from left to right), along with their respective variances. For purposes of illustration, assume that the "0" priority policy of reachability has already been analyzed, resulting in each of the four possible paths A-D to the destination. At the next highest priority, e.g., "1" round trip delay, a value for each path is determined, such as by using OER techniques described above. According to the example values returned in the first column, path A has the lowest (i.e., best) round trip delay value, 100 milliseconds (100 ms). The variance, e.g., 10%, is applied to this best value, resulting in a maximum allowed range from 100 ms (the lowest) to 110 ms (the variance-defined range maximum). All other paths having values not within the range are removed (e.g., path D), and the subset of remaining paths is established (e.g., paths A-C, circled). Notably, to include path D in further analysis and comparison, the variance for this policy would need to be at least 30%.

Because more than one path remains at the first priority, the node, e.g., the Master OER node, continues to the next priority policy, e.g., "2" lowest packet loss. Here, of the remaining paths, the lowest packet loss is path C with 0 packets/minute (packets/min). Applying the variance for this policy, i.e., 5 packets/min, the acceptable range is between 0 and 5 packets/min, or paths B and C. Already, those skilled in the art will understand that while path A would have been the best option based on the highest priority decision, the high rate of packet loss may result in an overall worse path than other available paths. Continuing to the next priority policy, e.g., "3" lowest cost, the node may determine that the values for the remaining paths (B and C) are equal, and thus need not apply variances, but instead simply move to the next priority. In this case, the next priority policy, e.g., "4" lowest utilization, is analyzed in accordance with the present invention, and because the value of path C is not within the variance-defined range of path B (i.e., 90% is greater than 40% plus a 25% variance), path B is selected as the best path. Notably, in the event the value for path C was within the range (or equal) at the lowest priority policy, as described herein the node may select the best path based on other known methods.

Figure 5:
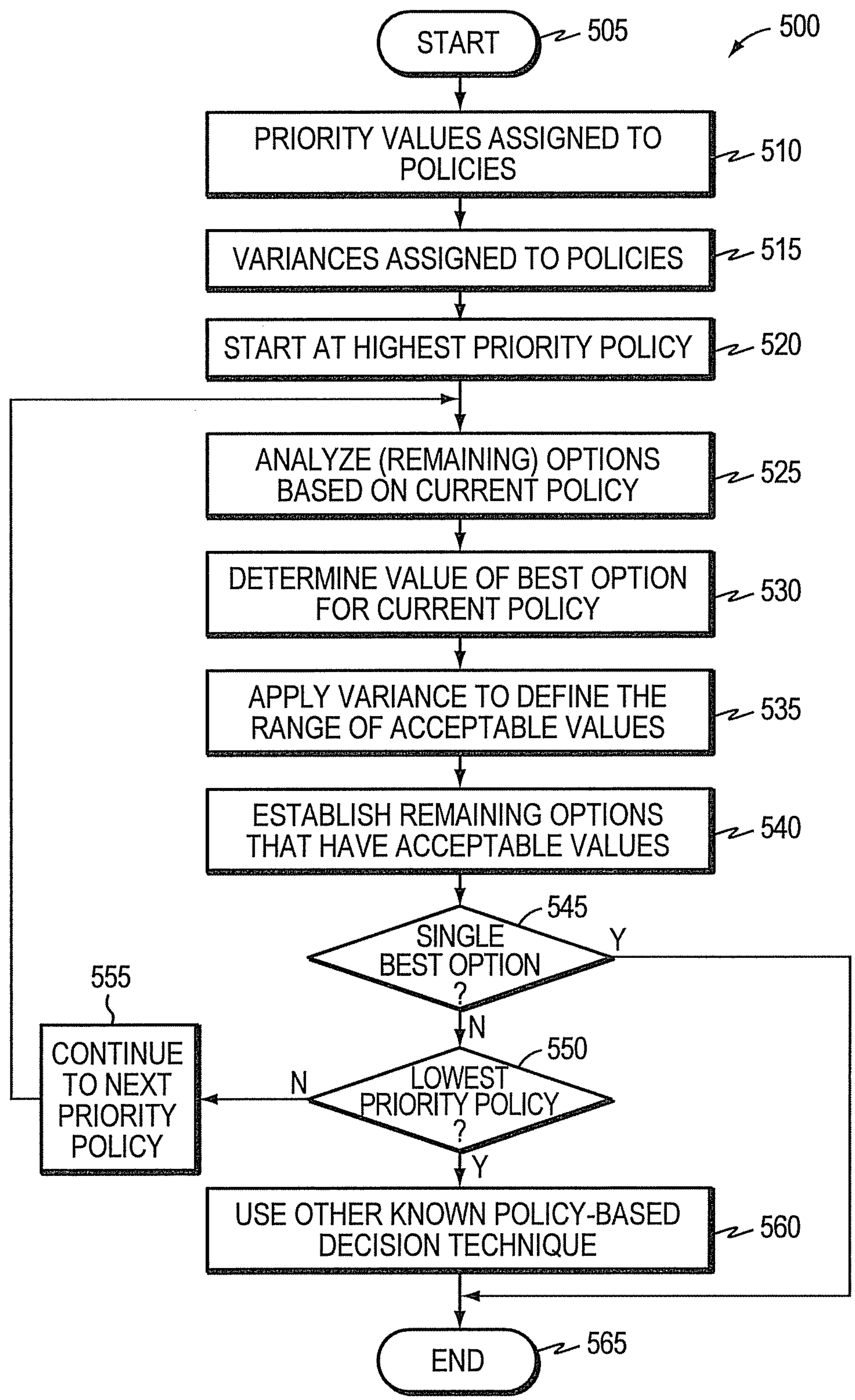
FIG. 5 is a flowchart illustrating a procedure for efficiently making a policy-based decision from a plurality of options based on policy priority in accordance with the present invention.

FIG. 5 is a flowchart illustrating a procedure for efficiently rendering a policy-based decision from a plurality of options based on policy priority in accordance with the present invention. The procedure 500 starts at step 505, and continues to step 510, where priority values are assigned to configured policies at a node, and variances are assigned to the policies in step 515, as described above (e.g., with reference to FIG. 3). Starting at the highest priority policy in step 520, the node analyzes the options (e.g., paths) based on the highest (current) priority policy in step 525. At step 530, the node determines the value of the best option based on the current priority policy, and in step 535 applies the corresponding variance to define the range of acceptable values as described above. Once the range is defined, the node establishes which options remain that have acceptable values in step 540, such as by removing those options that have values falling outside of the acceptable range. If more than one option still remains in step 545, and the current priority policy is not the lowest priority policy in step 550, then the procedure continues to the next priority policy in step 555, and returns to step 525 where the node analyzes the remaining options. If at step 550 the current priority is the lowest priority, then the node may be configured to select the best option based on other known policy-based decisions (or randomly) in step 560. Once a single best option exists in step 545, or other decisions are made in step 560, the procedure ends at step 565 with a single best option selected.

Advantageously, the novel technique efficiently renders a policy-based decision from a plurality of options based on policy priority in a computer network. By applying a variance to each prioritized policy, thereby creating a range of acceptable values for the policy based on the best option for that policy, the novel technique allows other options having an acceptable value to be considered again at the next priority policy. In this way, the ultimate best option selection is not limited to the best option of the highest priority value, but rather the best option of a plurality of options with acceptable values at the different priority policies. Also, reducing the variance of each prioritized policy allows for the novel technique to closely reflect a strict priority technique with minimal reconfiguration.

While there has been shown and described an illustrative embodiment that efficiently renders a policy-based decision from a plurality of options based on policy priority in a computer network, it is to be understood that various other adaptations and modifications may be made within the spirit and scope of the present invention. For example, the invention has been shown and described herein as selecting an option (path) from among a plurality of paths from a source to a destination. However, the invention in its broader sense is not so limited, and may, in fact, be used to select from any kind of prioritized policy-based option, such as a plurality of data/file servers (e.g., based on workload, response time, etc.), computers, applications, processes, etc., as will be understood by those skilled in the art. Also, while the invention has been shown and described herein applying a plurality of policies to a particular prefix, those skilled in the art will understand that the invention may also apply to a plurality of policies for a group of prefixes or other managed objects.

The foregoing description has been directed to specific embodiments of this invention. It will be apparent, however, that other variations and modifications may be made to the described embodiments, with the attainment of some or all of their advantages. For instance, it is expressly contemplated that the teachings of this invention can be implemented as software, including a computer-readable medium having program instructions executing on a computer, hardware, firmware, or a combination thereof. Also, electromagnetic signals may be generated to carry computer executable instructions that implement aspects of the present invention over, e.g., a wireless data link or a data network, such as the Internet. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method comprising:

ascertaining a value for an option for a particular policy of a plurality of policies that are ranked in a priority order;

applying, by a node in a computer network, a variance to the value associated with the option for the particular policy to define a range of acceptable values for the particular policy;

determining, by the node, whether one or more other options exist that have values within the range of acceptable values for the particular policy; and in response to the determining, if no other options exist that have values within the range of acceptable values for the particular policy, selecting the option, and if one or more other options exist that have values within the range of acceptable values for the particular policy, repeating the ascertaining, applying and determining for a next lower priority policy of the plurality of policies to consider the one or more other options, the repeating to occur successively until an option is selected.

2. The method of claim 1, wherein each option is a path in the computer network and the plurality of policies are rules regarding selection of a best path.

3. The method of claim 2, wherein each path is a path to a particular destination prefix.

4. The method of claim 1, wherein the plurality of policies include one or more policies selected from the group consisting of: reachability, lowest round trip time, lowest packet loss, lowest cost, and lowest utilization.

5. The method of claim 1, further comprising:

if there is not another lower priority policy, selecting one of the one or more other options as the selected option.

6. The method of claim 5, wherein selecting one of the one or more other options as the selected option is by random selection.

7. The method of claim 1, further comprising:

assigning a separate respective variance to each policy of the plurality of policies.

8. The method of claim 1, further comprising:

assigning each of the plurality of policies a respective exclusive priority value to rank the plurality of policies in the priority order.

9. The method of claim 1, further comprising:

assigning the variance as a percentage value.

10. The method of claim 1, wherein the node in the computer network is an Optimized Edge Router in the computer network.

11. An apparatus comprising:

one or more network interfaces;

a processor coupled to the one or more network interfaces and configured to execute software processes; and a memory configured store a decision making software process executable by the processor, the decision making software process configured to:

ascertain a value for an option for a particular policy of a plurality of policies that are ranked in a priority order, apply a variance to the value associated with the option for the particular policy to define a range of acceptable values for the particular policy, determine whether one or more other options exist that have values within the range of acceptable values for the particular policy, and in response to the determining, if no other options exist that have values within the range of acceptable values for the particular policy, select the option, and if one or more other options exist that have values within the range of acceptable values for the particular policy, further execute the decision making software process for a next lower priority policy of the plurality of policies to consider the one or more other options, the decision making software process to continue to be executed for successively next lower priority policies until an option is selected.

12. The apparatus of claim 11, wherein each option is a path in the computer network.

13. The apparatus of claim 12, wherein the plurality of policies are rules regarding selection of a best path.

14. The apparatus of claim 11, wherein the plurality of policies include one or more policies selected from the group consisting of: reachability, lowest round trip time, lowest packet loss, lowest cost, and lowest utilization.

15. The apparatus of claim 11, wherein the decision making software process is further configured to:

if there is not another lower priority policy, select one of the one or more other options as the selected option.

16. The apparatus of claim 15, wherein the selection of one of the one or more other options as the selected option is by random selection.

17. The apparatus of claim 11, wherein each policy of the plurality of policies is assigned a separate respective variance.

18. The apparatus of claim 11, wherein the variance of at least one policy of the plurality of policies is a percentage value.

19. The apparatus of claim 11, wherein the apparatus is an Optimized Edge Router.

20. One or more non-transitory computer readable media encoded with software that when executed is operable to:

ascertain a value for a path that may be selected by a particular path selection policy of a plurality of path selection policies that are ranked in a priority order;

apply a variance to the value to define a range of acceptable values for the particular path selection policy;

determine whether one or more other paths exist that have values within the range of acceptable values for the particular path selection policy; and in response to the determination, select the path, if no other paths exist that have values within the range of acceptable values for the particular path selection policy, and apply a next lower priority path selection policy of the plurality of path selection policies, if one or more other paths exist that have values within the range of acceptable values for the particular path selection policy.

* * * * *